(12) United States Patent
Berglund et al.

(10) Patent No.: US 7,965,681 B2
(45) Date of Patent: Jun. 21, 2011

(54) CHANNEL ALLOCATION PROCEDURE IN A MESHED NETWORK

(75) Inventors: Jan Erik Johan Berglund, Cupertino, CA (US); Zheng Li, San Jose, CA (US); Kevin Tang, Dublin, CA (US)

(73) Assignee: Nokia Siemens Networks Oy, Espoo (FI)

( * ) Notice: Subject to any disclaimer, the term of this patent is extended or adjusted under 35 U.S.C. 154(b) by 664 days.

(21) Appl. No.: 12/152,771

(22) Filed: May 16, 2008

(65) Prior Publication Data

US 2009/0285165 A1    Nov. 19, 2009

(51) Int. Cl.
*H04W 4/00* (2009.01)
(52) U.S. Cl. ...................................... 370/329
(58) Field of Classification Search .......... 370/312, 370/313, 328–339, 341; 455/436, 450–454
See application file for complete search history.

(56) References Cited

U.S. PATENT DOCUMENTS

| | | | | |
|---|---|---|---|---|
| 7,457,620 | B2 * | 11/2008 | Lam et al. ................ | 455/434 |
| 2007/0047492 | A1 * | 3/2007 | Kim et al. ................ | 370/331 |
| 2007/0070937 | A1 | 3/2007 | Demirhan et al. .......... | 370/328 |
| 2008/0062933 | A1 * | 3/2008 | Liu et al. ................ | 370/332 |

FOREIGN PATENT DOCUMENTS

WO   WO 2005/074212 A1   8/2005
WO   WO 2008/036756 A2   3/2008

OTHER PUBLICATIONS

Ohrtman, Frank, "WiMAX Architecture-Backhaul Networks Architecting for Success", http://www.wimax.com/commentary/spotlight/backhaul-for-wimax-networks-architecting-f..., May 8, 2008, 6 pgs.
IEEE Std 802.11™-2007 (Revision of IEEE Std 802.11-1999) IEEE Standard for Information technology Telecommunications and information exchange between systems—Local and metropolitan area networks Specific requirements Part 11: Wireless LAN Medium Access Control (MAC) and Physical Layer (PHY) Specifications.

* cited by examiner

*Primary Examiner* — Frank Duong
(74) *Attorney, Agent, or Firm* — Harrington & Smith (57) ABSTRACT

A method includes receiving at a gateway mesh node a channel set list indicating radio channels that are allowed for use by the gateway mesh node, scanning channels in the channel set list and creating a list of channels in order of interference that is present, allocating channels from the list of channels to a plurality of radios that comprise the gateway mesh node, and initiating transmission of beacon frames from each of the plurality of radios on a main channel. Each beacon frame includes information descriptive of a path cost representing a sum of all link costs back to a central point, a primary radio channel used by the radio transmitting the beacon frame, a channel set indicating only those channels that an associated portion of the mesh network is allowed to use, and a set of meshed nodes associated with the radio.

54 Claims, 7 Drawing Sheets

7A — RECEIVING A BEACON FROM A RADIO OF A MESHED NODE, THE BEACON COMPRISING INFORMATION DESCRIPTIVE OF A PATH COST REPRESENTING A SUM OF ALL LINK COSTS FROM THE RADIO OF THE MESHED NODE BACK TO A CENTRAL POINT, A PRIMARY RADIO CHANNEL USED BY THE RADIO TRANSMITTING THE BEACON FRAME, A CHANNEL SET INDICATING THOSE CHANNELS THAT AN ASSOCIATED PORTION OF A MESH NETWORK IS ALLOWED TO USE, AND A SET OF MESHED NODES ASSOCIATED WITH THE RADIO TRANSMITTING THE BEACON FRAME

7B — USING AT LEAST SOME OF THE INFORMATION TO ESTIMATE A LINK COST ASSOCIATED WITH THE RADIO

FIG.7

CHANNEL ALLOCATION PROCEDURE IN A MESHED NETWORK

TECHNICAL FIELD

The exemplary and non-limiting embodiments of this invention relate generally to wireless communication systems, methods, devices and computer programs and, more specifically, relate to wireless mesh networks and to constituent components thereof.

BACKGROUND

Various abbreviations that appear in the specification and/or in the drawing figures are defined as follows:
AP access point
BTS base transceiver station
CRC cyclic redundancy check
DVB digital video broadcast
FDD frequency division duplex
GPS global positioning system
GSM global system for mobile communication
IP internet protocol
MAC medium access control
O&M operations and management
PCI peripheral component interface
QAM quadrature amplitude modulation
SGMII serial gigabit media independent interface
TDD time division duplex
TDM time division multiplex
USB universal serial bus
WCDMA wideband code division multiple access
WLAN wireless local area network
WMN wireless mesh network Meshed wireless networking is becoming an important method for backhauling traffic from radio access nodes. The field of wireless meshed networking has evolved from military use over the past several decades into commercial applications such as those found in WiFi and WiMAX systems. Current research has been directed to a single radio backhaul meshed with 360 degree omnidirectional coverage. For multi-radio systems research has primarily been directed point-to-point or point-to-multipoint systems.

As radios are becoming less expensive it is economically feasible to package multiple radios into one meshed node. However, when using multiple radios per node a channel allocation problem arises, as each radio needs to operate on a specific channel. That channel should be selected so that intra-node interference is avoided and inter-node interference and hidden terminal problems are minimized, while at the same time maintaining connectivity and optimizing performance in terms of channel utilization and throughput.

Channel allocation in multi-radio systems, e.g., in sectorized cellular radios, has traditionally been done using pre-deployment radio planning manually or semi-automatically off-line. This has been feasible as the numbers of nodes have been fairly few, and the cost of professional radio planning is a small percentage of the total cost of deploying the network. However, with WiFi radios operating in unlicensed spectrum and with smaller cell sizes this is no longer true. In such as system the number of nodes will typically be large, and it is not readily knowable before installation how these nodes will interact with the environment in terms of reach, signal bounce and existing interference in the used spectrum.

A feature of IEEE 802.11-type systems is the use of a beacon frame. A typical beacon frame is several tens of bytes in length, with about half of the length being a common frame header and CRC field. As with other frames, the header includes source and destination MAC addresses as well as other information regarding the communications process. The destination address is set to all ones, which is the broadcast MAC address. This forces all other stations on the applicable channel to receive and process each beacon frame. The CRC field provides error detection capability.

The body of the beacon frame is located between the header and the CRC field. Each beacon frame conventionally carries the following information in the frame body.

a) Beacon interval. This represents the amount of time between beacon transmissions. Before a station enters power save mode, the station needs the beacon interval to know when to wake up to receive the beacon (and learn whether there are buffered frames at the AP).

b) Timestamp. After receiving a beacon frame, a station uses the timestamp value to update its local clock. This process enables synchronization among all stations that are associated with the same access point.

c) Service Set Identifier (SSID). The SSID identifies a specific wireless LAN. Before associating with a particular wireless LAN, a station must have the same SSID as the access point. Access points include the SSID in the beacon frame to enable sniffing functions to identify the SSID and automatically configure the wireless network interface with the proper SSID. In some cases the SSID may not be included for security reasons.

d) Supported rates. Each beacon carries information that describes the rates that the particular wireless LAN supports. For example, a beacon may indicate that only certain (1, 2, and 5.5 Mbps) data rates are available. With this information, stations can use performance metrics to decide which access point to associate with.

e) Parameter Sets. The beacon includes information about the specific signaling methods (such as frequency hopping spread spectrum, direct sequence spread spectrum, etc.). For example, a beacon would include in the appropriate parameter set the channel number that an IEEE 802.11b access point is using. Likewise, a beacon associated with a frequency hopping network may indicate the frequency hopping pattern and the dwell time at each hopped frequency.

f) Capability Information. This field indicates the requirements of stations that wish to join the wireless LAN from where the beacon originated. As one example, the Capabilities Information may indicate that all stations must use wired equivalent privacy (WEP) in order to join the WLAN.

g) Traffic Indication Map (TIM). An access point periodically sends the TIM within a beacon to identify which stations using power saving mode have data frames waiting for them in the access point's buffer. The TIM identifies a station by an association ID that the access point assigned to the station during a station association process.

Improvements are needed to the existing beaconing techniques to enhance the operation of a wireless meshed network.

SUMMARY

The foregoing and other problems are overcome, and other advantages are realized, by the use of the exemplary embodiments of this invention.

In a first aspect thereof the exemplary embodiments of this invention provide a method that includes receiving at a gateway mesh node a channel set list indicating radio channels that are allowed for use by the gateway mesh node, scanning channels in the channel set list and creating a list of channels in order of interference that is present, allocating channels from the list of channels to a plurality of radios that comprise the gateway mesh node, and initiating transmission of beacon frames from each of the plurality of radios on a main channel. Each beacon frame comprises information descriptive of a path cost representing a sum of all link costs back to a central point, a primary radio channel used by the radio transmitting the beacon frame, a channel set indicating only those channels that an associated portion of the mesh network is allowed to use, and a set of meshed nodes associated with the radio.

In another aspect thereof the exemplary embodiments of this invention provide a memory medium that stores program instructions, the execution of the program instructions by a data processor resulting in operations that comprise receiving at a gateway mesh node a channel set list indicating radio channels that are allowed for use by the gateway mesh node; scanning channels in the channel set list and creating a list of channels in order of interference that is present; allocating channels from the list of channels to a plurality of radios that comprise the gateway mesh node; and initiating transmission of beacon frames from each of the plurality of radios on a main channel, each beacon frame comprising information descriptive of a path cost representing a sum of all link costs back to a central point, a primary radio channel used by the radio transmitting the beacon frame, a channel set indicating only those channels that an associated portion of the mesh network is allowed to use, and a set of meshed nodes associated with the radio.

In a further aspect thereof the exemplary embodiments of this invention provide an apparatus that includes a controller configured with a plurality of radios and operable, when said apparatus is configured as a gateway mesh node of a wireless meshed network, to receive a channel set list indicating radio channels that are allowed for use by the gateway mesh node, to scan channels in the channel set list and creating a list of channels in order of interference that is present and to allocate channels from the list of channels to the plurality of radios. The controller is further configured to initiate transmission of beacon frames from each of the plurality of radios on a main channel. Each beacon frame includes information descriptive of a path cost representing a sum of all link costs back to a central point, a primary radio channel used by the radio transmitting the beacon frame, a channel set indicating only those channels that an associated portion of the mesh network is allowed to use, and a set of meshed nodes associated with the radio.

In a further aspect thereof the exemplary embodiments of this invention provide a method that includes receiving a beacon from a radio of a meshed node, the beacon comprising information descriptive of a path cost representing a sum of all link costs from the radio of the meshed node back to a central point, a primary radio channel used by the radio transmitting the beacon frame, a channel set indicating those channels that an associated portion of a mesh network is allowed to use, and a set of meshed nodes associated with the radio transmitting the beacon frame. The method further includes using at least some of the information to estimate a link cost associated with the radio.

In still another aspect thereof the exemplary embodiments of this invention provide an apparatus that includes means for receiving a beacon from a radio of a meshed node, the beacon comprising information descriptive of a path cost representing a sum of link costs from the radio of the meshed node back to a central point, a primary radio channel used by the radio transmitting the beacon frame, a channel set indicating those channels that an associated portion of a mesh network is allowed to use, and a set of meshed nodes associated with the radio transmitting the beacon frame. The apparatus further includes means for using at least some of the information to estimate a link cost associated with the radio.

BRIEF DESCRIPTION OF THE DRAWINGS

In the attached Drawing Figures:

FIG. 2A is a simplified exemplary block diagram of one embodiment of the mesh nodes shown in FIG. 1, while

DETAILED DESCRIPTION

The exemplary embodiments of this invention provide for a multi-radio mesh network to select radio channels for best throughput and minimal interference, and at the same time to find a least cost path back to a gateway node in the mesh. These exemplary embodiments use local decisions in the meshed nodes, and do not require central coordination. The exemplary embodiments of this invention achieve these and other features by extending the use of IEEE 802.11-type beacons. In these exemplary embodiments each node in the mesh network publishes information sufficient for surrounding nodes to make an independent decision on how to join the mesh, and how to best allocate the channels across the multiple radios contained within each mesh node.

The exemplary embodiments may be used to advantage when RF planning is unfeasible technically or economically, and may be applied in wireless mesh networks where the mesh nodes have omnidirectional coverage with one or multiple radios per node.

The following definitions may be used herein.

Meshed node: A node with one or more radios used for meshed backhaul.

Gateway: A meshed node that has a wireline or separate wireless link to a central point, such as a central office.

Figure 1:
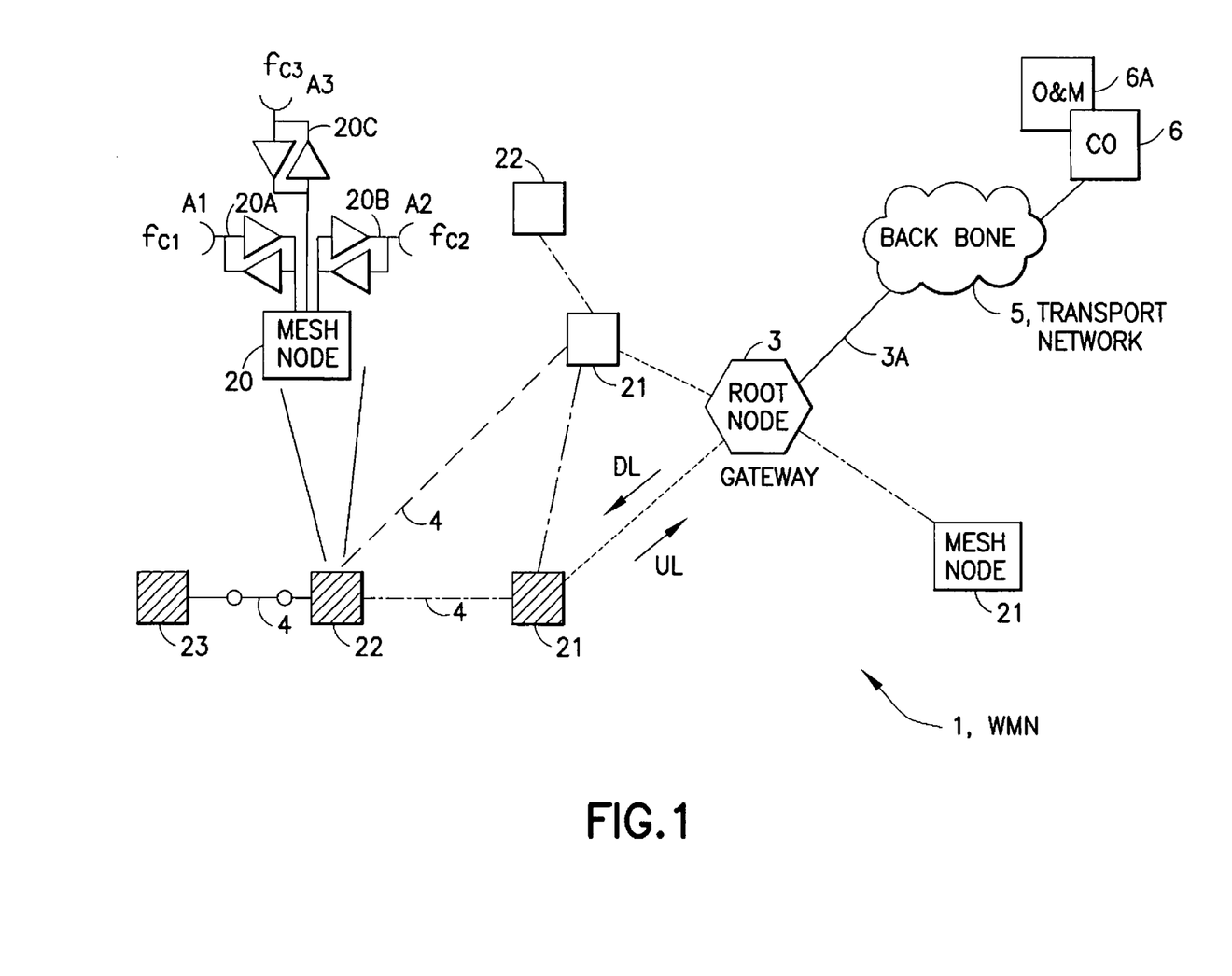
FIG. 1 is a simplified block diagram of an exemplary WMN-based data backhaul network.

FIG. 1 is a simplified block diagram of an exemplary WMN-based data backhaul network 1 that includes a root node (also referred to herein as a gateway (GW) 3) and mesh nodes 20 (which may be considered to function as wireless routers or switches/bridges). In the exemplary mesh topology shown in FIG. 1 certain mesh nodes 21 are one hop from the gateway 3, certain other mesh nodes 22 are two hops from the gateway 3 and another mesh node 23 is three hops from the gateway 3. The gateway 3 is connected to a backbone transport network 5 (e.g. an IP network or an Ethernet based Network) through a link 3A, for example, a fiber, cable or a microwave link. The transport network 5 can provide connectivity to a central point or a central office (CO) 6. Associated with the CO 6 may be an O&M unit 6A. Radio connections 4 exist between the mesh nodes 21, 22, 23, via directional antennas A1, A2, A3, as well as between mesh nodes 21 and the gateway 3. The directional antennas A1, A2, A3 may be arranged to provide 360 degree (or approximately 360 degree) coverage. All data traffic and control information to and from individual mesh nodes 20 are routed through the gateway 3 (connected with the high bandwidth transport network 5). It can be appreciated that the traffic load is higher for those mesh nodes (21) closest to the gateway 3, as the traffic for the other mesh nodes (22, 23) passes through them.

Figure 3:
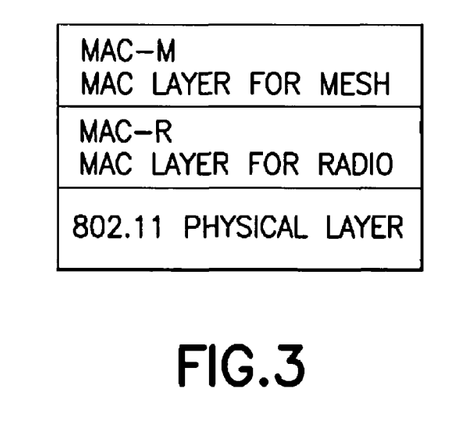
FIG. 3 depicts an exemplary mesh node protocol stack.

To increase throughput and reduce delay, the WMN data backhaul nodes use a multi-transceiver structure. Each mesh node 20 (as well as the gateway 3) may be designed to support several simultaneous (physical) channels using multiple parallel RF frontend chips and baseband processing modules. On top of the physical layer (e.g., an IEEE 802.11 physical layer, as shown in FIG. 3) there are radio and mesh-related MAC layers to coordinate the functions of the multiple channels. The radio connections 4 for the mesh nodes 20 may be implemented using any suitable radio technology with a standard or a custom physical layer.

Figure 2A:
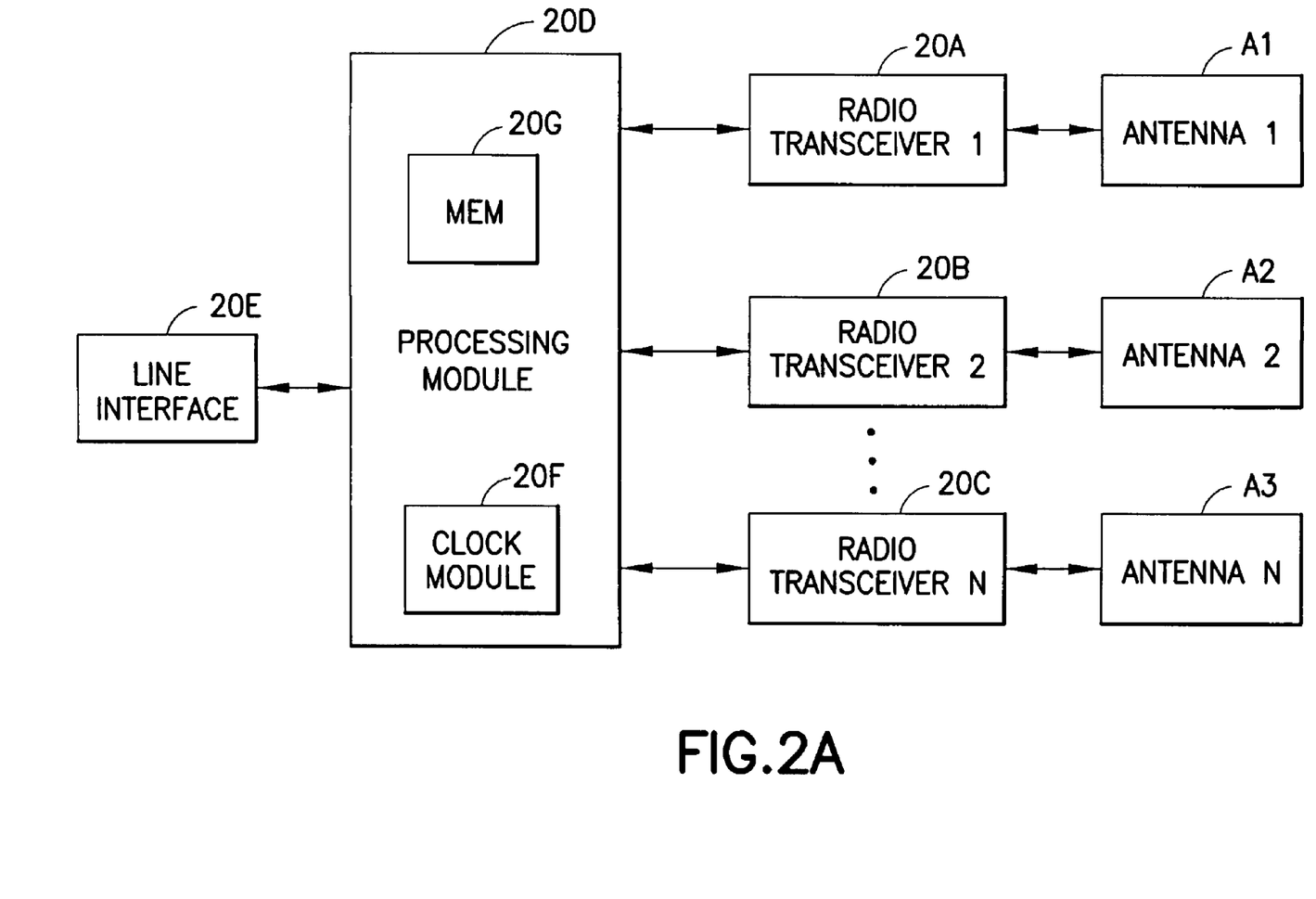

As shown in FIG. 2A, in the exemplary embodiments the mesh nodes 20 may be assumed to each include a plurality of transceivers 20A, 20B, 20C operating with directional antennas A1, A2, A3 at different frequencies $fc1, fc2, fc3$, respectively. Note that these exemplary embodiments are not limited for use with three transceivers, antennas and frequencies.

FIG. 2A shows the general structure of one exemplary embodiment of a mesh node 20. The typical mesh node 20 may include several (e.g., three) radio modules or transceivers 20A, 20B and 20C, a processing module 20D, a line interface 20E and a synchronization and clock module 20F. A memory (MEM) 20G is associated with the processing module 20D and stores computer programs that direct the operation of the mesh node 20, as well as buffered transmit and received data, data structures expressive of protocol stacks, packet routing table(s) and the like. The radio transceivers 20A, 20B, 20C process the RF and baseband signals of the wireless links. Each radio transceiver 20A, 20B, 20C is configured with a corresponding antenna element of the antenna array, which is composed of multi-antenna elements, such as three 120 degree antennas or six 60 degree antennas that together may provide 360 degree coverage. The processing module 20D includes one or more data processors for MAC layer processing, IP layer processing and routing (see the exemplary protocol stack shown in FIG. 3). When the processing module 20D receives a packet from one of the radio transceivers 20A, 20B or 20C it checks to see if the packet carries a local, broadcast or a multicast address. If so, the processing module 20D processes the packet locally. If the packet address indicates that the received packet is not intended for this particular mesh node 20, the processing module 20D checks the switching/routing table stored in the local memory 20G and routes the packet towards the correct child node (downlink) or parent node (uplink) using the corresponding transceiver 20A, 20B or 20C. Since the processing module 20D processes and routes/switches the data packet in the local mesh node 20, the processing time can be very fast as compared with the data packet transmission and processing time in one of the radio transceivers. The processing module 20D is also used to control the radio transceivers 20A, 20B, 20C according to system configuration, such as the used channel, frame structure and transmit and receive time.

The line interface 20E provides the interface between the mesh node 20 and access device(s) which use the mesh data backhaul. The access devices can be, for example, a WLAN AP, GSM BTS, WCDMA NodeB or a DVBT BTS. The line interface 20E may be implemented using, for example, Ethernet or T1/E1 technology. In practice the access radio can also be attached to the processing module 20D in the same way as a mesh radio. Suitable technologies include, for example, PCI, USB and SGMII.

The synchronization and clock module 20F provides a clock to synchronize the operation of the mesh node 20 to a system clock (e.g., to a GPS time-based clock, or any other suitable timing source). The clock module 20F need only provide moderate accuracy that is used for, by example, gratuitous beacon generation, as described below.

Figure 2B:
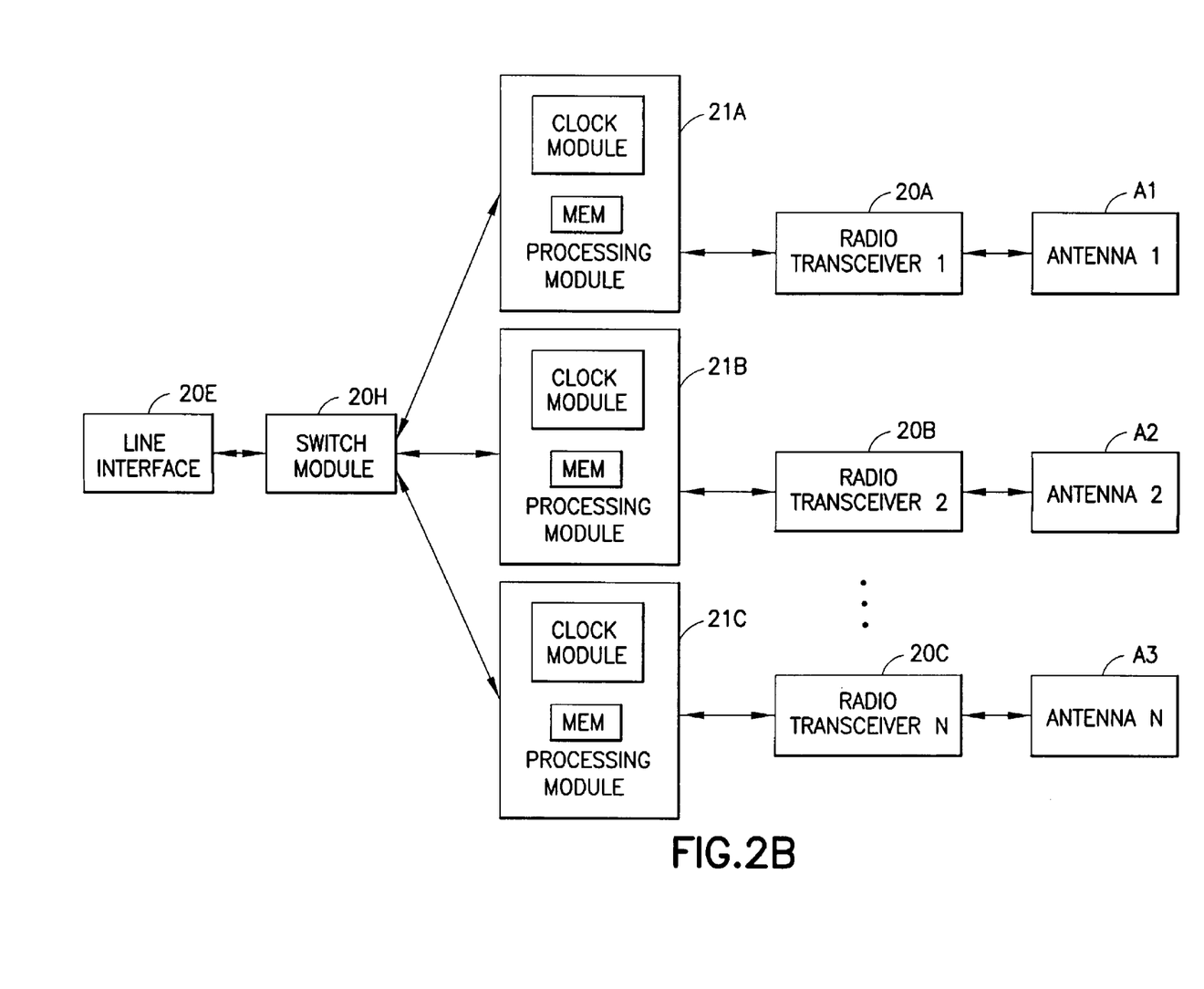
FIG. 2B is a simplified exemplary block diagram of another embodiment of the mesh nodes shown in FIG. 1.

FIG. 2B shows another exemplary embodiment of a mesh node 20. In this case there are a plurality of processing modules 21A, 21B, 21C, individual ones of which are associated with an individual one of the radio transceivers 20A, 20B, 20C. In this embodiment there may be a switch module 20H connected between the processing modules 21A, 21B, 21C and the line interface 20E enabling the processing modules to share access to/from the line interface 20E. Access radio modules can be directly connected to processing modules 21A, 21B, 21C, as described above for the processing module 20D.

Note that the gateway 3 can be similarly constructed as the mesh nodes 20, and will in general also include the interface to the data link 3A to the backbone network.

Having thus described one exemplary and non-limiting WMN wherein the invention may be embodied, a description is now provided of the exemplary embodiments of this invention.

In accordance with a basic procedure, the gateway 3 begins by obtaining a channel set (a list of channels it is allowed to use) from the central operating and management (O&M) system 6A. The gateway 3 then scans on all the channels in the channel set to create a list of channels in order of descending interference. The interference assessment is performed, as a non-limiting example, based on the noise floor of the channel and the identified traffic on the channel. It may be assumed that the RF isolation between the different radios (transceiver modules 20A, 20B, 20C) in the gateway 3 requires each radio to use a unique, non-overlapping radio channel.

The channel assessment is preferably performed on a per-sector basis. Each sector will have quality values for each channel. The selection is done so that the maximum throughput can be achieved. For example, and assuming a three sector case, channel 1 might actually be best at all sectors, while one sector has a problem with channel 2 and another sector has a problem with channel 3. In this case the sectors that have challenging conditions in channels 2 and 3 avoid the use of those channels. The distribution is such that challenging channel conditions are avoided.

Figure 4:
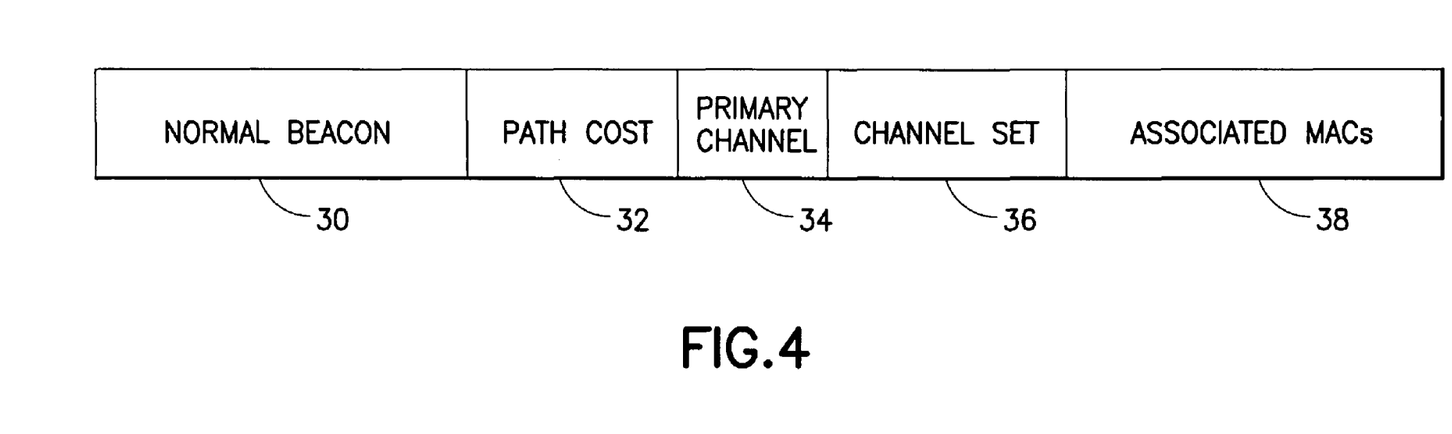
FIG. 4 shows, in accordance with exemplary aspects of this invention, a beacon frame that is extended to include path cost, primary channel, channel set and set of associated meshed nodes information.

When each of the radios has been allocated a radio channel (a main channel), each radio begins a beaconing process to announce its presence and metrics. Referring to FIG. 4, when using an IEEE 802.11-based radio the standard (conventional) beacon 30 is extended with the following information (not necessarily in the same order shown in FIG. 4):

path cost 32,
primary channel 34,
channel set 36; and
set of associated meshed nodes (MACs) 38.

The primary channel 34 indicates the main channel used by a specific radio, as explained below in greater detail. The channel set 36 is a list of channels the gateway 3 received from the central O&M system 6A (or it may be preconfigured). The channel set 36 is the list of channels as received from the O&M system 6A. The order of the channels in the list may have no intrinsic meaning. The channel set 36 may be considered as a listing of those channels that this part of the mesh is allowed to use. In general, the radio conditions at location A will not represent the radio conditions at location B. The channel set 36 may contain more member channels than the number of sectors per node and, as noted, represents the only channels that this portion of the WMN 1 will be allowed to use. The path cost 32 represents the sum of all link costs to get back to the central office 6, and is relative to the use of spectrum to transmit a frame to the central office 6. From the gateway 3 this metric may be normally set to zero. Each subsequent node 20 in the WMN 1 advertises in the beacon 30 its associated path cost. The per-hop link cost may be calculated, for example, as proposed in IEEE 802.11s drafts:

Link cost=cost of fictive 512 byte packet=(75 us+110 us+4096/modulation rate)*1/(1-bit error rate) for an IEEE 802.11a based radio.

The set of associated meshed nodes 38 is a list of meshed nodes 20 associated with this specific radio 20A, 20B, 20C on the meshed node 20. This is used to determine if there is a hidden node situation, as explained below.

In general, before a sector has any associated nodes it beacons a null list of associated nodes, as each sector during operation is expected to indicate only those nodes that it is associated with. This enables an ability to locally detect if there are any hidden nodes. If a particular sector receives a beacon from another node, but does not receive a beacon from one or more nodes in the associated received set of nodes, it can assume the existence of at least one hidden node and can adjust the path cost accordingly, and possibly may avoid that path altogether.

When a mesh node 20 attempts to assess the options of gaining connectivity to the WMN 1 it scans the channels and listens for beacons. Based on the collected beacon information from the radios 20, 20B, 20C of the meshed node 20, for example: path cost; beacon signal strength; beacon signal to noise ratio (SNR); the number of associated meshed nodes for a specific beacon; and list of associated nodes as such; and in conjunction with more static characteristics such as receiver sensitivity for different modulation rates, an estimate of the virtual link cost can be accomplished.

The path cost is calculated by adding the additional link cost. This can be achieved by estimating the possible modulation rate as a function of receiver sensitivity, beacon signal strength and beacon SNR. This is due to the fact that beacons are typically sent using a lower modulation rate than typical data traffic. The additional link cost can then be calculated according to, for example, an IEEE 802.11s based metric. If a received beacon indicates that it has associated meshed nodes 20, the additional link cost is estimated differently in order to compensate for the presence of the other nodes that are connected to the same meshed node 20. This can be achieved, for example, as:

compensated modulation rate=channel assessed modulation rate/($N$+1), where $N$ is the number of already associated meshed nodes.

From this calculation(s), the lowest path cost is selected as the primary candidate and the meshed node 20 attempts to associate to the corresponding meshed node. This also determines the channel for one radio that associates to the WMN 1. The assignment of channels to the other radios (the other radio transceivers (e.g., 20B, 20C) is performed using a different algorithm that attempts to as a primary objective to minimize interference with nodes around the node 20, and as secondary objective to maximize new routes for those meshed nodes 20 further away. The channels used for the other radios should be as noise free as possible for the gateway 3, and with as little traffic as possible on them. This ensures that other meshed nodes trying to connect to the WMN 1 through this meshed node 20 have the best possible radio conditions.

If the channel assigned radios 20A, 20B 20C can make an association with other nodes 20, not re-selecting the channel, this is preferably done to provide a fast backup if the main link fails. These links are blocked in a bridge forwarding table to avoid creating loops.

Discussed now is hidden node detection. If a particular received beacon 30 indicates in the associated MACs field 38 that it has associated meshed node(s) 20, but the radio does receive a beacon from such associated nodes, it may be assumed that there is a situation with hidden nodes. This can cause severe performance degradation, and thus is preferably avoided when selecting a connection link. In a practical implementation this may be accomplished by modifying the link cost by penalizing the link cost by a greater amount, e.g., using:

compensated modulation rate=channel assessed modulation rate/($n*N$+1), where $N$ is the number of already associated meshed nodes, and where $n$ has a value greater than 1 (e.g., $n=2$).

In general, a node 20 can be hidden if no line of sight (LOS) exists between the nodes. As an example, consider three nodes A, B, C, where node A can hear (communicate with) node B and node A can hear node C. However, nodes B and C cannot hear each other due to some RF obstruction (e.g., a building) between them. In IEEE 802.11, having a distributed control function (DCF), it is the responsibility of each node to listen before sending so as to avoid transmission collisions. In this case this procedure will only work partially, since if A is sending nodes B and C will not transmit. If node B is sending node A will not transmit, however node C will not realize that it should not send as it may determine that the ether is free and may transmit at the same time as node B. The result is a collision resulting in wasted power, as well as potentially destroying the message sent from node B to node A.

Figure 5:
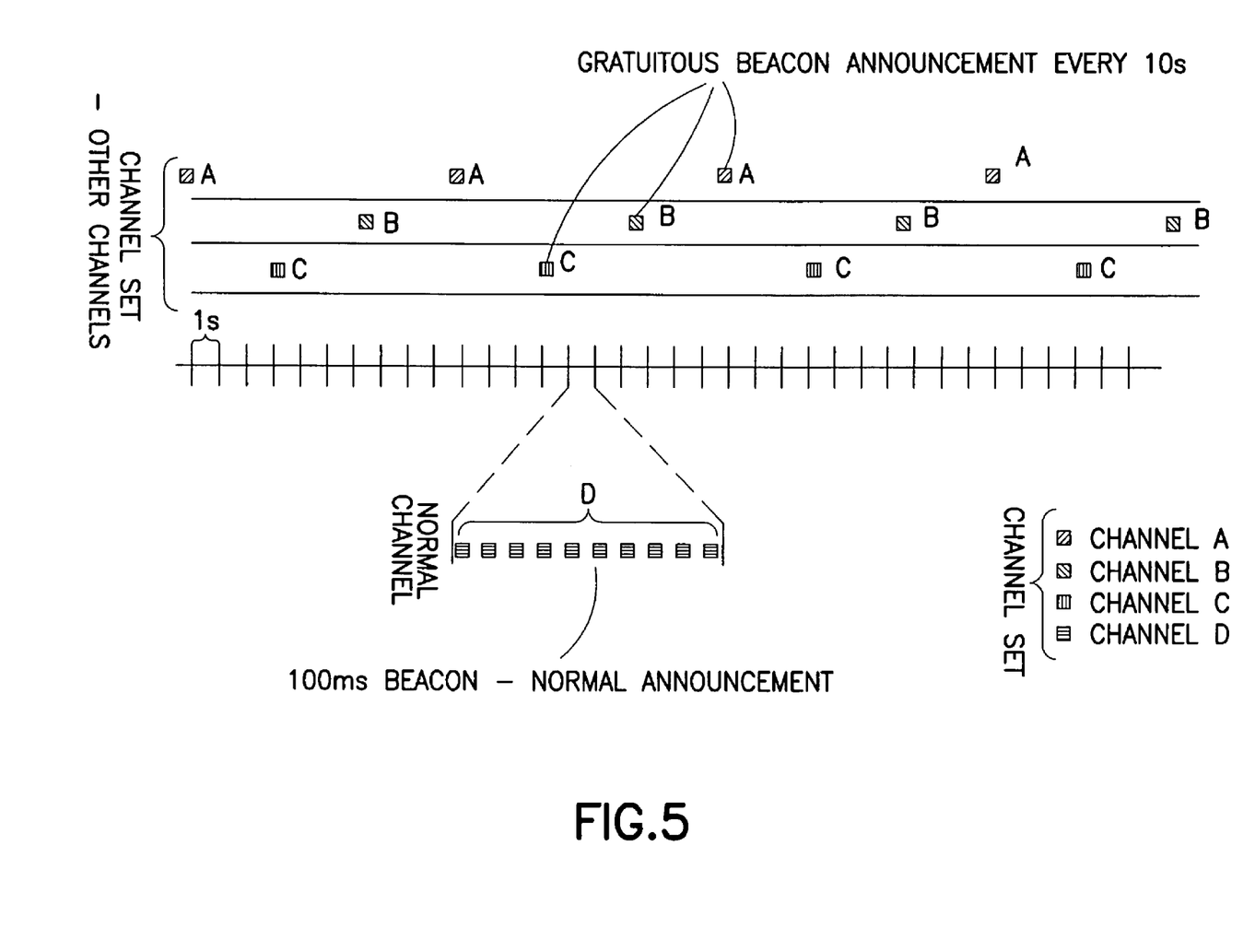
FIG. 5 shows the use of gratuitous beaconing on other channels of the channel set.

Discussed now is gratuitous channel beaconing. Reference is also made to FIG. 5. In order to constantly maintain an updated best selection table, including in a steady state when the channels have been assigned to the radios, each radio should step out of its main channel periodically and beacon on other channels in the channel set. This makes it possible for all the radios in an IEEE 802.11 type of scenario to continue to listen to their own channel while still receiving information of surrounding nodes. To differentiate these beacons from normal beacons each gratuitous beacon may carry "my channel" information. If this channel is different from the channel the receiving radio is listening to it can thus be determined that this is a gratuitous beacon from a mesh radio that normally listens to a different channel. In general, the gratuitous beaconing is performed by each sector of each node 20.

The meshed node 20 registers the alternative cost coming from other nodes when it receives an alternative beacon. This is preferably a continuous process that is performed in order to assess that the network is operating under optimal conditions, and enabling a transition to be made to an alternative mesh configuration should a failure occur.

Discussed now is channel re-selection. Non-limiting examples of events that may trigger a change of mesh configuration can include the following.

a) The return path node sends a beacon that it will be taken out of service. This event may be due to changes further down the tree (towards the root node 3), and the action in response may be to assess the new situation for some period of time (e.g., 10 seconds) before making a new selection.

b) Another event may be a loss of the main return path. For example, the beacon from the main return node is lost for some period of time (e.g., 3 seconds), and the action in response may be to immediately attempt to select a new path.
c) Another event may be a determination that an alternative path cost is some amount (e.g., 50%) of the currently used path cost, and the action in response may be to immediately attempt to select the alternative path.
d) Another possible event may be operator intervention with a forced re-selection through the O&M system 6A, and the response may be to immediately attempt to select a new path.

Before switching and re-selecting channels the node 20 may beacon for some period of time (e.g., 1 second) on its primary channel, and may also issue two beacons on each of the other channels in the channel set, with special note that it will be taken out of service. This need not follow slow beaconing in the adjacent channels and is preferably performed immediately.

The use of these exemplary embodiments enables sending the associated meshed node list in the beacon, and facilitates detecting and avoiding the hidden node situation. Factoring in the associated meshed node list when calculating path cost provides an advantageous technique to avoid or reduce the occurrence of the hidden node problem.

The use of these exemplary embodiments also enables decoupling the channel assignment from the layer 2 routing/switching, and facilitates making rapid detection and link changes based on radio link layer metrics. It is thus not necessary to use a spanning tree protocol to avoid loops.

The use of these exemplary embodiments further enables forming a minimal mesh to reduce radio interference and thereby increases network capacity, thereby also facilitating layer 3 routing/layer 2 switching.

The use of these exemplary embodiments also provides for the gratuitous beaconing to facilitate inter-radio path discovery over multiple channels.

Based on the foregoing it should be apparent that the exemplary embodiments of this invention provide a method, apparatus and computer program product(s) to provide enhanced operation of a wireless meshed network.

Figure 6:
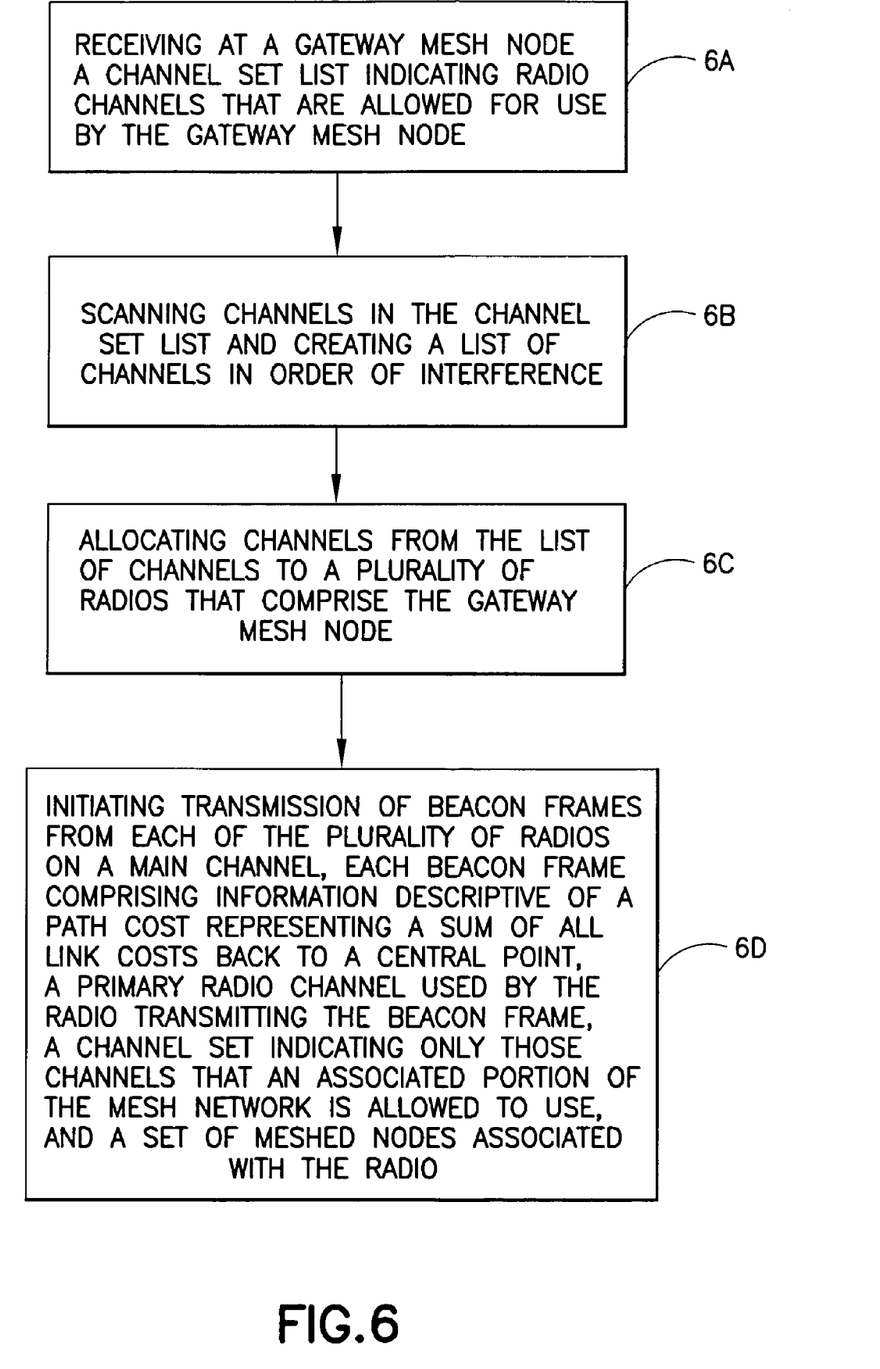
FIG. 6 is a logic flow diagram that illustrates the operation of a method, and a result of execution of computer program instructions, in accordance with the exemplary embodiments of this invention.

FIG. 6 is a logic flow diagram that illustrates the operation of a method, and a result of execution of computer program instructions, in accordance with the exemplary embodiments of this invention. At Block 6A there is a step of receiving at a gateway mesh node a channel set list indicating radio channels that are allowed for use by the gateway mesh node. At Block 6B there is a step of scanning channels in the channel set list and creating a list of channels in order of interference that is present. At Block 6C there is a step of allocating channels from the list of channels to a plurality of radios that comprise the gateway mesh node. At Block 6D there is a step of initiating transmission of beacon frames from each of the plurality of radios on a main channel, each beacon frame comprising information descriptive of a path cost representing a sum of all link costs back to a central point, a primary radio channel used by the radio transmitting the beacon frame, a channel set indicating only those channels that an associated portion of the mesh network is allowed to use, and a set of meshed nodes associated with the radio.

In the execution of the method and computer program of the preceding paragraph, the path cost is set to zero by the gateway mesh node.

In the execution of the method and computer program of the preceding paragraphs, further comprising a subsequent meshed node advertising in a transmitted beacon an associated path cost.

In the execution of the method and computer program of the preceding paragraphs, where a subsequent meshed node operates a plurality of radios to receive beacons and collect information, and further comprising estimating a virtual link cost for each of the plurality of radios.

In the execution of the method and computer program of the preceding paragraph, where the virtual link cost is estimated using one or more of path cost, beacon signal strength, beacon signal to noise ratio and the number of associated meshed nodes for a specific beacon.

In the execution of the method and computer program of the preceding paragraphs, where the path cost is calculated by adding additional link cost, where if a received beacon indicates that the transmitting meshed node has at least one associated meshed node, the additional link cost is estimated so as to compensate for the presence of at least one associated meshed node.

In the execution of the method and computer program of the preceding paragraph, where the additional link cost is estimated using:

> compensated modulation rate=channel assessed modulation rate/($N$+1), where $N$ is the number of already associated meshed nodes.

In the execution of the method and computer program of the preceding paragraphs, further comprising, based on the additional link cost estimation, selecting a lowest path cost for attempting to associate to the corresponding meshed node, including assignment of a radio channel to a first radio.

In the execution of the method and computer program of the preceding paragraph, further comprising assigning channels to other radios so as to minimize interference between the radios of the meshed node.

In the execution of the method and computer program of the preceding paragraphs, where if it is determined that a particular meshed node from which a beacon is received is associated with a hidden node, further comprising estimating the link cost in a manner to penalize the particular meshed node so as to reduce the likelihood of association with the particular meshed node.

In the execution of the method and computer program of the preceding paragraphs, further comprising periodically transmitting a beacon on a channel other than the main channel.

In the execution of the method and computer program of the preceding paragraph, where the periodically transmitted beacon comprises information for enabling a receiving meshed node to distinguish it from a beacon transmitted on the main channel.

In the execution of the method and computer program of the preceding paragraphs, where a meshed node receiving the periodically transmitted beacon uses it to determine an associated path cost.

In the execution of the method and computer program of the preceding paragraphs, where in response to an occurrence of an event that triggers a change of mesh configuration, re-selecting at least one of the radios to another channel from the channel set.

Figure 7:
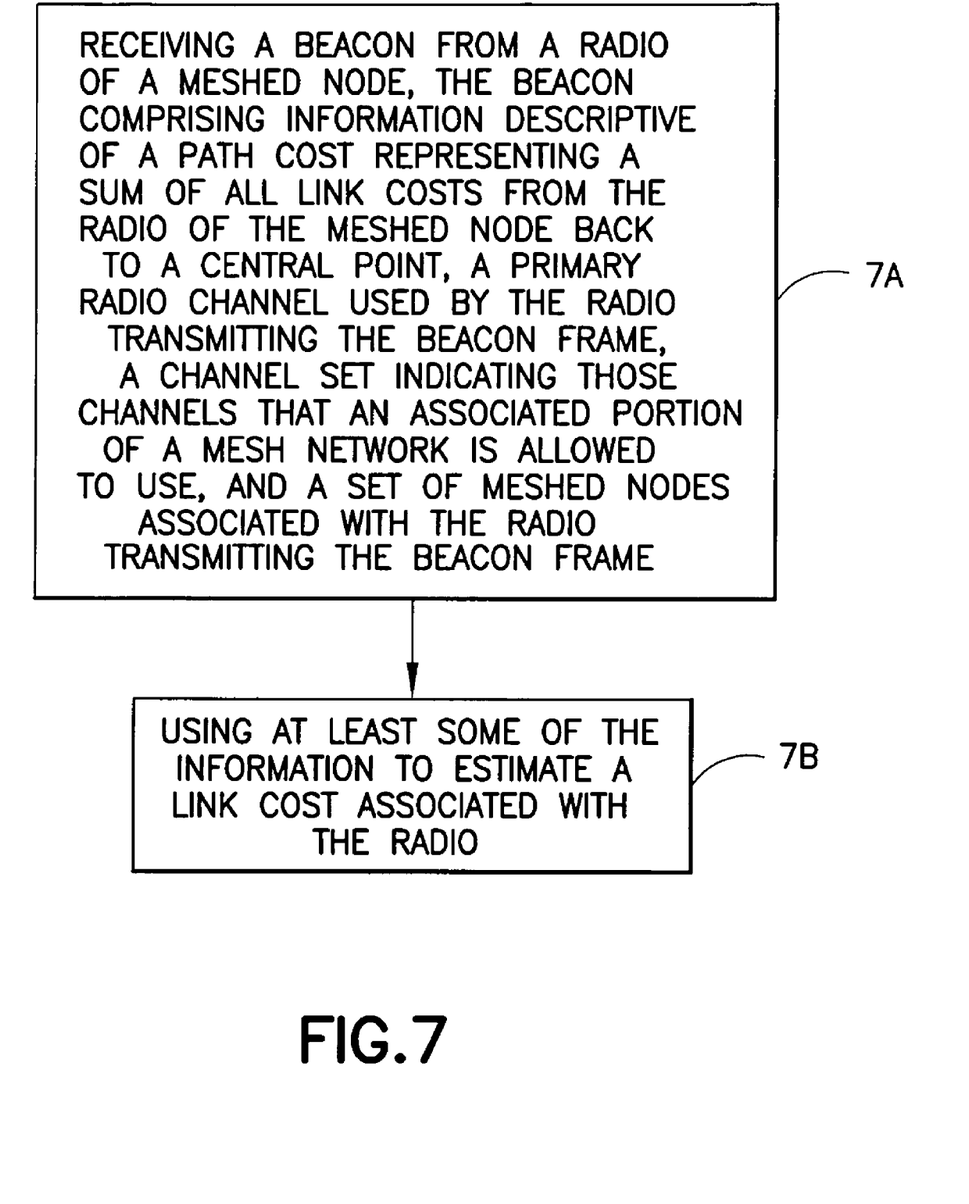
FIG. 7 is a logic flow diagram that illustrates the operation of a method, and a result of execution of computer program instructions, further in accordance with the exemplary embodiments of this invention.

FIG. 7 is a logic flow diagram that illustrates the operation of a method, and a result of execution of computer program instructions, further in accordance with the exemplary embodiments of this invention. At Block 7A there is a step of receiving a beacon from a radio of a meshed node, the beacon comprising information descriptive of a path cost representing a sum of link costs from the radio of the meshed node back to a central point, a primary radio channel used by the radio transmitting the beacon frame, a channel set indicating those channels that an associated portion of a mesh network is allowed to use, and a set of meshed nodes associated with the radio transmitting the beacon frame. At Block 7B there is a step of using at least some of the information to estimate a link cost associated with the radio.

In the execution of the method and computer program of the preceding paragraph, where the link cost is estimated using one or more of the path cost, beacon signal strength, beacon signal to noise ratio and the associated meshed nodes.

In the execution of the method and computer program of the preceding paragraph, where the path cost is calculated by adding additional link cost, where if the received beacon indicates that the transmitting meshed node has at least one associated meshed node, the additional link cost is estimated so as to compensate for the presence of at least one associated meshed node.

In the execution of the method and computer program of the preceding paragraph, where the additional link cost is estimated using:

compensated modulation rate=channel assessed modulation rate/($N$+1), where $N$ is the number of already associated meshed nodes.

In the execution of the method and computer program of the preceding paragraphs, further comprising, based on the additional link cost estimation, selecting a path having a lowest cost for attempting to associate to the corresponding meshed node.

In the execution of the method and computer program of the preceding paragraphs, where if it is determined that the meshed node from which a beacon is received is associated with a hidden node, further comprising estimating the link cost in a manner to penalize the meshed node so as to reduce the likelihood of association with the meshed node.

In the execution of the method and computer program of the preceding paragraphs, further comprising periodically transmitting a beacon on a primary radio channel, and periodically transmitting a gratuitous beacon on at least one non-primary channel.

In the execution of the method and computer program of the preceding paragraphs, where in response to an occurrence of an event that triggers a change of mesh configuration, re-selecting at least one radio to another channel from the channel set.

The various blocks shown in FIGS. 6 and 7 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of IEEE 802.11-type mesh networks, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    receiving at a gateway mesh node a channel set list indicating radio channels that are allowed for use by the gateway mesh node;
    scanning channels in the channel set list and creating a list of channels in order of interference that is present;
    allocating channels from the list of channels to a plurality of radios that comprise the gateway mesh node; and
    initiating transmission of beacon frames from each of the plurality of radios on a main channel, each beacon frame comprising information descriptive of a path cost representing a sum of all link costs back to a central point, a primary radio channel used by the radio transmitting the beacon frame, a channel set indicating only those channels that an associated portion of the mesh network is allowed to use, and a set of meshed nodes associated with the radio.

2. The method of claim 1, where the path cost is set to zero by the gateway mesh node.

3. The method of claim 1, further comprising a subsequent meshed node advertising in the beacon an associated path cost.

4. The method of claim 1, where a subsequent meshed node operates a plurality of radios to receive beacons and collect information, further comprising estimating a virtual link cost for each of the plurality of radios.

5. The method of claim 4, where the virtual link cost is estimated using one or more of path cost, beacon signal strength, beacon signal to noise ratio and the number of associated meshed nodes for a specific beacon.

6. The method of claim 4, where the path cost is calculated by adding additional link cost, where if a received beacon indicates that the transmitting meshed node has at least one associated meshed node, the additional link cost is estimated so as to compensate for the presence of at least one associated meshed node.

7. The method of claim 6, where the additional link cost is estimated using:

> compensated modulation rate=channel assessed modulation rate/($N$+1), where $N$ is the number of already associated meshed nodes.

8. The method of claim 6, further comprising, based on the additional link cost estimation, selecting a lowest path cost for attempting to associate to the corresponding meshed node, including assignment of a radio channel to a first radio.

9. The method of claim 8, further comprising assigning channels to other radios so as to minimize interference between the meshed nodes.

10. The method of claim 6, where if it is determined that a particular meshed node from which a beacon is received is associated with a hidden node, further comprising estimating the link cost in a manner to penalize the particular meshed node so as to reduce the likelihood of association with the particular meshed node.

11. The method of claim 1, further comprising periodically transmitting a beacon on a channel other than the main channel.

12. The method of claim 11, where the periodically transmitted beacon comprises information for enabling a receiving meshed node to distinguish it from a beacon transmitted on the main channel.

13. The method of claim 11, where a meshed node receiving the periodically transmitted beacon uses it to determine an associated path cost.

14. The method of claim 1, where in response to an occurrence of an event that triggers a change of mesh configuration, re-selecting at least one of the radios to another channel from the channel set.

15. A memory medium that stores program instructions, the execution of the program instructions by a data processor resulting in operations that comprise:
  receiving at a gateway mesh node a channel set list indicating radio channels that are allowed for use by the gateway mesh node;
  scanning channels in the channel set list and creating a list of channels in order of interference that is present;
  allocating channels from the list of channels to a plurality of radios that comprise the gateway mesh node; and
  initiating transmission of beacon frames from each of the plurality of radios on a main channel, each beacon frame comprising information descriptive of a path cost representing a sum of all link costs back to a central point, a primary radio channel used by the radio transmitting the beacon frame, a channel set indicating only those channels that an associated portion of the mesh network is allowed to use, and a set of meshed nodes associated with the radio.

16. The memory medium of claim 15, where the path cost is set to zero by the gateway mesh node.

17. The memory medium of claim 15, further comprising a subsequent meshed node advertising in the beacon an associated path cost.

18. The memory medium of claim 15, where a subsequent meshed node operates a plurality of radios to receive beacons and collect information, further comprising estimating a virtual link cost for each of the plurality of radios.

19. The memory medium of claim 18, where the virtual link cost is estimated using one or more of path cost, beacon signal strength, beacon signal to noise ratio and the number of associated meshed nodes for a specific beacon.

20. The memory medium of claim 18, where the path cost is calculated by adding additional link cost, where if a received beacon indicates that the transmitting meshed node has at least one associated meshed node, the additional link cost is estimated so as to compensate for the presence of at least one associated meshed node.

21. The memory medium of claim 20, where the additional link cost is estimated using:

> compensated modulation rate=channel assessed modulation rate/($N$+1), where $N$ is the number of already associated meshed nodes.

22. The memory medium of claim 20, further comprising, based on the additional link cost estimation, selecting a lowest path cost for attempting to associate to the corresponding meshed node, including assignment of a radio channel to a first radio.

23. The memory medium of claim 22, further comprising assigning channels to other radios so as to minimize interference between the meshed nodes.

24. The memory medium of claim 20, where if it is determined that a particular meshed node from which a beacon is received is associated with a hidden node, further comprising estimating the link cost in a manner to penalize the particular meshed node so as to reduce the likelihood of association with the particular meshed node.

25. The memory medium of claim 15, further comprising periodically transmitting a beacon on a channel other than the main channel.

26. The memory medium of claim 25, where the periodically transmitted beacon comprises information for enabling a receiving meshed node to distinguish it from a beacon transmitted on the main channel.

27. The memory medium of claim 25, where a meshed node receiving the periodically transmitted beacon uses it to determine an associated path cost.

28. The memory medium of claim 15, where in response to an occurrence of an event that triggers a change of mesh configuration, re-selecting at least one of the radios to another channel from the channel set.

29. An apparatus, comprising:
  a controller configured with a plurality of radios and operable, when said apparatus is configured as a gateway mesh node of a wireless meshed network, to receive a channel set list indicating radio channels that are allowed for use by the gateway mesh node, to scan channels in the channel set list and creating a list of channels in order of interference that is present and to allocate channels from the list of channels to the plurality of radios, said controller further configured to initiate transmission of beacon frames from each of the plurality of radios on a main channel, each beacon frame comprising information descriptive of a path cost representing a sum of all link costs back to a central point, a primary radio channel used by the radio transmitting the beacon frame, a channel set indicating only those channels that an associated portion of the mesh network is allowed to use, and a set of meshed nodes associated with the radio.

30. The apparatus of claim 29, where the path cost is set to zero by the gateway mesh node.

31. The apparatus of claim 29 where, when said apparatus is configured as a non-gateway mesh node of the wireless meshed network, said controller is configured to advertise in the beacon an associated path cost.

32. The apparatus of claim 29, where when said apparatus is configured as a non-gateway mesh node of the wireless meshed network, said controller is configured to operate said plurality of radios to receive beacons and collect information, and to estimate a virtual link cost for each of the plurality of radios.

33. The apparatus of claim 32, where said controller is configured to estimate the virtual link cost using one or more of path cost, beacon signal strength, beacon signal to noise ratio and the number of associated meshed nodes for a specific beacon.

34. The apparatus of claim 32, where said controller is configured to calculate path cost by adding additional link cost, where if a received beacon indicates that the transmitting meshed node has at least one associated meshed node, the additional link cost is estimated so as to compensate for the presence of at least one associated meshed node.

35. The apparatus of claim 34, where said controller is configured to estimate the additional link cost using:

compensated modulation rate=channel assessed modulation rate/($N$+1), where $N$ is the number of already associated meshed nodes.

36. The apparatus of claim 34, where said controller is further configured, based on the additional link cost estimation, to select a lowest path cost for attempting to associate to the corresponding meshed node, including assignment of a radio channel to a first radio, and to assign channels to other radios so as to minimize interference between the meshed nodes.

37. The apparatus of claim 32, where said controller is further configured, in response to determining that a particular meshed node from which a beacon is received is associated with a hidden node, to estimate the link cost in a manner to penalize the particular meshed node so as to reduce the likelihood of association with the particular meshed node.

38. The apparatus of claim 29, said controller further configured to periodically transmit a beacon on a channel other than the main channel.

39. The apparatus of claim 38, where the periodically transmitted beacon comprises information for enabling a receiving meshed node to distinguish it from a beacon transmitted on the main channel.

40. The apparatus of claim 29, where when said apparatus is configured as a non-gateway mesh node of the wireless meshed network, said controller is further configured, when embodied in a meshed node that receives the periodically transmitted beacon, to use it to determine an associated path cost.

41. The apparatus of claim 29, said controller is configured to respond to an occurrence of an event that triggers a change of mesh configuration to re-select at least one of the radios to another channel from the channel set.

42. A method, comprising:
receiving a beacon from a radio of a meshed node, the beacon comprising information descriptive of a path cost representing a sum of all link costs from the radio of the meshed node back to a central point, a primary radio channel used by the radio transmitting the beacon frame, a channel set indicating those channels that an associated portion of a mesh network is allowed to use, and a set of meshed nodes associated with the radio transmitting the beacon frame; and
using at least some of the information to estimate a link cost associated with the radio.

43. The method of claim 42, where the link cost is estimated using one or more of the path cost, beacon signal strength, beacon signal to noise ratio and the associated meshed nodes.

44. The method of claim 43, where the path cost is calculated by adding additional link cost, where if the received beacon indicates that the transmitting meshed node has at least one associated meshed node, the additional link cost is estimated so as to compensate for the presence of at least one associated meshed node.

45. The method of claim 44, where the additional link cost is estimated using:

compensated modulation rate=channel assessed modulation rate/($N$+1), where $N$ is the number of already associated meshed nodes.

46. The method of claim 44, further comprising, based on the additional link cost estimation, selecting a path having a lowest cost for attempting to associate to the corresponding meshed node.

47. The method of claim 44, where if it is determined that the meshed node from which a beacon is received is associated with a hidden node, further comprising estimating the link cost in a manner to penalize the meshed node so as to reduce the likelihood of association with the meshed node.

48. The method of claim 42, further comprising periodically transmitting a beacon on a primary radio channel, and periodically transmitting a gratuitous beacon on at least one non-primary channel.

49. The method of claim 42, where in response to an occurrence of an event that triggers a change of mesh configuration, re-selecting at least one radio to another channel from the channel set.

50. An apparatus, comprising:
means for receiving a beacon from a radio of a meshed node, the beacon comprising information descriptive of a path cost representing a sum of link costs from the radio of the meshed node back to a central point, a primary radio channel used by the radio transmitting the beacon frame, a channel set indicating those channels that an associated portion of a mesh network is allowed to use, and a set of meshed nodes associated with the radio transmitting the beacon frame; and
means for using at least some of the information to estimate a link cost associated with the radio.

51. The apparatus of claim 50, further comprising means, responsive to a determination that the meshed node from which a beacon is received is associated with a hidden node, for estimating the link cost so as to penalize the meshed node to reduce the likelihood of association with the meshed node.

52. The apparatus of claim 50, further comprising means for periodically transmitting a beacon on a primary radio channel, and periodically transmitting a gratuitous beacon on at least one non-primary radio channel.

53. The apparatus of claim 50, further comprising means, responsive to an occurrence of an event that triggers a change of mesh configuration, for re-selecting at least one radio to another channel from a set of channels that are allowed for use at an associated location of a wireless mesh network.

54. The apparatus of claim 50, embodied at least partially as an integrated circuit configurable to be installed within a wireless node of a wireless meshed network.

\* \* \* \* \*